United States Patent [19]

Kojima et al.

[11] 3,925,313
[45] Dec. 9, 1975

[54] POLYIMIDE WATER-SOLUBLE COMPOSITION

[75] Inventors: Makoto Kojima; Yuzuru Noda; Yasuhiro Suzuki; Toshihide Okamoto, all of Osaka, Japan

[73] Assignee: Nitto Electric Industrial Co., Ltd., Ibaraki, Japan

[22] Filed: July 9, 1974

[21] Appl. No.: 486,932

[30] Foreign Application Priority Data

Nov. 9, 1973  Japan............................ 48-126587

[52] U.S. Cl. ...... 260/47 CP; 117/128.4; 260/29.2 N
[51] Int. Cl.². ......................................... C08G 73/10
[58] Field of Search........ 260/78 TF, 29.2 N, 47 CP

[56] References Cited
UNITED STATES PATENTS

| 3,179,632 | 4/1965 | Hendrix | 260/78 |
| 3,440,196 | 4/1969 | Boldebuck et al. | 260/29.2 |
| 3,448,068 | 6/1969 | Holub et al. | 260/29.2 |
| 3,573,132 | 3/1971 | Ducloux et al. | 156/306 |
| 3,663,728 | 5/1972 | Hoback et al. | 260/29.2 N |
| 3,673,145 | 6/1972 | Minami et al. | 260/32.4 N |
| 3,766,117 | 10/1973 | McQuade | 260/29.2 |
| 3,810,858 | 5/1974 | Boldebuck | 260/29.2 |

Primary Examiner—Lester L. Lee
Attorney, Agent, or Firm—Sughrue, Rothwell, Mion, Zinn & Macpeak

[57] ABSTRACT

A water-soluble composition comprising an ammonium salt of a polyimide precursor having a residual acid value ratio of about 3 to 30%, the ammonium salt of the polyimide precursor comprising the reaction product obtained on reaction of 1,2,3,4-butane tetracarboxylic acid and a diamine in a water-soluble solvent and, optionally, water to obtain a polyimide precursor and followed by formation of the ammonium salt of the polyimide precursor.

8 Claims, No Drawings

POLYIMIDE WATER-SOLUBLE COMPOSITION

BACKGROUND OF THE INVENTION

1. Field of the Invention

This invention relates to water-soluble compositions, and more particularly, to a water-soluble composition of the polyimide precursor reaction product of 1,2,3,4-butane tetracarboxylic acid and a diamine having a residual acid value ratio of about 3 to 30% solubilized with ammonia.

2. Description of the Prior Art

Hitherto, since imide type polymers have excellent heat resistance, chemical resistance and electric properties, they have been used in many fields as coatings, adhesives, moldings and fibers where heat resistance and chemical resistance are desired.

However, in imide-type polymers, heat resistant polymers are generally produced by the process which comprises polymerizing aromatic tetracarboxylic acid derivatives such as pyromellitic acid dianhydride, diethylpyromellitate diacid chloride and diamines in a polar organic solvent, molding the resulting soluble high molecular weight polyamic acid, and treating chemically or thermally to cause an intramolecular ring closure reaction.

However, the polyamic acid as a polyimide precursor has the defect that the ring closure reaction easily occurs during storage to form an insoluble and infusible polyimide. Further, since an expensive basic solvent such as N-methyl-2-pyrrolidone, N,N-dimethylacetamide or N,N-dimethylformamide is used in a large amount in order to produce the polymer, the polymer solution itself becomes expensive and a large amount of the solvent is released in the production steps. Accordingly, in recent years, this has been a problem from the standpoint of environmental pollution due to contamination of air and water.

On the other hand, although water solubilized compositions which finally form aromatic polyimide films are already known, such water solubilized compositions usually comprise polyamic acid as the polyimide precursor. However, the water solubilized compositions of polyamic acid tend to undergo a reduction in the degree of polymerization due to chemical changes such as an intramolecular dehydration reaction in the imide forming step and, consequently, the properties of the formed films are easily damaged and the mechanical properties thereof, such as strength and elongation, etc., are poor. Water solubilized compositions which are produced by reacting 1,2,3,4-butane tetracarboxylic acid as an acid component with diamines and by dissolving the resulted polyimide by adding alkanolamine and water are also known, as disclosed in Japanese Pat. Nos. 14503/72 and 19710/72. However, an alkanolamine is very toxic and adversely influences the storability of water solubilized compositions because of its presence in the system. Further, such compositions do not have sufficient flexibility and heat resistance. Although solubilization in a similar manner by treating the above-described polyimides with amines for forming salts such as tributylamine, pyridine or dimethylaniline, is known solubilization is generally difficult to carry out and films which are practical can not be formed even if solubilized. Furthermore, amines are very toxic similar to alkanolamines and adversely influence the storability because they accelerate decomposition.

SUMMARY OF THE INVENTION

As the result of studies for removing the above-described defects, the present invention has been accomplished.

Namely, the present invention provides a water-soluble composition which comprises the ammonium salt solubilized reaction product of 1,2,3,4-butane tetracarboxylic acid with a diamine in a water-soluble solvent or, if desired, in the presence of a water-soluble solvent and water to produce a polyimide precursor having a residual acid value ratio of about 3 to 30%, followed by water-solubilizing the polyimide precursor by forming an ammonium salt thereof.

DETAILED DESCRIPTION OF THE INVENTION

In the present invention, the polyimide precursor having a residual acid value ratio of about 3 to 30% which is produced by carrying out the reaction in a water-soluble solvent or, if desired, in the presence of a water-soluble solvent and water, is solubilized by changing the residual acid groups into ammonium salt groups. Accordingly, in the present invention, since the excess ammonia used in salt formation does not remain in the system, the resulting water-soluble compositions are stable toward decomposition during storage or baking. Further, they are low in toxicity and do not have a bad smell. Furthermore, according to the present invention, it is possible to obtain the excellent characteristics of flexibility and heat resistance which can not be obtained with prior art water solubilized compositions, since the above-described polyimide precursor has a residual acid value ratio of as low as about 3 to 30% resulting in the imide forming reaction thereof proceeding sufficiently, and the degree of polymerization thereof high enough that sufficient physical and mechanical properties are exhibited.

The reason why the residual acid value ratio of the polyimide precursor is limited to about 3 to 30% is as follows. Namely, if the ratio is below about 3%, solubilization becomes difficult to carry out, while if the ratio is above about 30%, although solubilization can be easily carried out, the mechanical properties and the appearance are adversely affected due to the formation of air cells, i.e., because a large amount of components is removed by heating the resulting water-soluble composition (dehydration, de-amination, etc.). For example, when the composition is used as a wire enamel, many bubbles appear in the coated film and the mechanical properties such as flexibility deteriorate.

The present invention can be suitably attained by heating 1,2,3,4-butane tetracarboxylic acid or, if desired, a composition comprising the derivatives thereof (mono-anhydride, di-anhydride, esters and amides, etc.) and a diamine in a water-soluble solvent or, if desired, in the presence of a water-soluble solvent and water, to form a polyimide, and adding ammonia to the resulting polyimide.

The concentration of butane tetracarboxylic acid and that of the diamine in the polymerization reaction are not limited, and can vary widely. A concentration of about 50 to 95% by weight is preferred. Namely, if the concentration is too high, operation becomes difficult because of an increase of the viscosity at reaction. If the concentration is too low, it is uneconomical because a large amount of the solvent is required and a large amount of the solvent is released on application. It is preferred that the butane tetracarboxylic acid component and the diamine be used in an equimolar amount to each other. However, the reaction can be carried out even if one of the components is present in a several percentage excess. It is preferred that the reaction temperature range from above about 60°C to the boiling point of the polymer system under normal pressure, and more preferably, in a range of from 80°C to the boiling point of the polymer system.

In the above-described treatment, an imide-forming reaction occurs and a polyimide precursor having a residual acid value ratio of about 3 to 30% can be produced. Hereinafter, the value is represented by mg. equivalent of the carboxyl group per gram of the sample, and the residual acid value ratio means the ratio of the residual acid value after the reaction based on the acid value of the carboxylic acid component at the beginning of the reaction being 100%. However, in the case of carrying out the reaction in the presence of the water-soluble solvent and water, the acid value of the system excluding the water at the beginning of the reaction is 100%.

As the ammonia for forming the salts, ammonia and an aqueous ammonia solution can be used. Usually, it is convenient to add the ammonia together with water which is used for diluting the composition. Although ammonia is preferably used in an amount equimolar to the acid value of the formed polyimide precursor, there is no upper limit on the amount. In this case, if the amount is in excess, it is of course uneconomical because the amount discharged becomes large. The temperature of formation of the salt of the polyimide precursor can range from about 0°C to 200°C, and preferably from 40°C to 120°C. Thus, water-soluble compositions can be easily produced.

In the polyimide precursor of the present invention, while it is essential to use 1,2,3,4-butane tetracarboxylic acid as an acid component, the kind of diamine is not limited.

Suitable diamines which can be used include aliphatic, alicyclic and aromatic diamines represented by the formula $H_2N-R'-NH_2$ ($R'$ represents a divalent organic group) and mixtures thereof. However, aromatic diamines are more practically used. Specific examples of diamines are as follows: m—phenylenediamine, p-phenylenediamine, 4,4'-diaminodiphenylmethane, 4,4'-diaminodiphenylethane, 4,4'-diaminodiphenylpropane, 4,4'-diaminodiphenyl ether, 3,4'-diaminodiphenyl ether, benzidine, 3,3'-dimethoxybenzidine, 4,4'-diaminodiphenyl sulfide, 4,4'-diaminodiphenyl sulfone, 3,3'-diaminodiphenyl sulfone, p-bis(4-aminophenoxy)-benzene, m-bis(4-aminophenoxy)-benzene, 4,4'-diaminobiphenyl, m-xylylenediamine, p-xylylenediamine, di-(p-aminocyclohexyl)-methane, hexamethylenediamine, heptamethylenediamine, oxtamethylenediamine, nonamethylenediamine, 4,4-dimethylheptamethylenediamine, 3-methoxyheptamethylenediamine, 2,11-diaminododecane, 1,4-diaminocyclohexane, 2,2'-diaminodiethyl ether, 2,2'-diaminodiethyl thioether, 3,3'-diaminodipropoxy-ethane, 2,6-diaminopyridine, guanamine, 2,5-diamino-1,3,4-oxadiazole, 2-(3'-aminophenyl)-5-aminobenzoxazole, bis(4-aminophenyl)-phosphine oxide and bis(4-aminophenyl)-diethyl silane, etc. These amines can be used alone or as a mixture thereof.

The water-soluble solvents which can be used in the present invention can be represented by the following formula (a), (b), (c) or (d):

a. $R - OH$ wherein $R$ represents a monovalent organic group of an aliphatic or alicyclic compound having 3 to 8 carbon atoms;

b. $HO - R_1 - OH$ wherein $R_1$ represents (1) a divalent organic group of an aliphatic or alicyclic compound having 3 to 8 carbon atoms, or (2) a divalent group having the formula

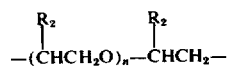

wherein n represents 0 to 5 and $R_2$ represents a hydrogen atom or a methyl group;

c. $R_3O - (CH_2CH_2O)_m - R_4$ wherein $m$ represents 1 to 3, $R_3$ represents a lower alkyl group having 1 to 4 carbon atoms, and $R_4$ represents a hydrogen atom or a $-OOCCH_3$ group, or $R_3$ and $R_4$ are both methyl groups; or d. 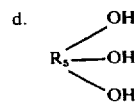

wherein $R_5$ represents a residual group of glycerine or trimethylolpropane.

Suitable examples of the water-soluble solvent included in (a) above are isopropyl alcohol, n-butyl alcohol, t-butyl alcohol, hexyl alcohol, cyclohexanol and the like. Suitable examples of the solvent included in (b) above are ethylene glycol, diethylene glycol, triethylene glycol, tetraethylene glycol, other low molecular polyethylene glycol, propylene glycol, dipropylene glycol, 1,4-butanediol, 1,6-hexanediol, 1,4-cyclohexanediol and the like. Suitable examples of the solvent included in (c) above are ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monoisopropyl ether, diethylene glycol monobutyl ether, triethylene glycol monomethyl ether, ethylene glycol dimethyl ether, diethylene glycol dimethyl ether, ethylene glycol monoethyl ether acetate, diethylene glycol monoethyl ether acetate and the like. Suitable examples of the solvent included in (d) above are glycerine, trimethylolpropane and the like. Particularly preferred solvents are glycols and glycerine. These solvents can be used alone or as a mixture thereof. Further, basic solvents such as N-methyl-2-pyrrolidone, N,N-dimethylacetamide or N,N-dimethylformamide do not adversely effect the water-solubilization.

Although these water-soluble solvents can be used alone for carrying out the reaction, it is sometimes more effective operationally if the reaction is carried out in the presence of water at the start. Since the water is removed from the reaction system the temperature increases, the reaction system can be kept uniform from the beginning.

The concentration of the polymer in the water-soluble composition of the present invention is not limited to a specific range. However, a concentration of about 10 to 70% by weight is usually suitable. When the water-soluble composition of the invention is processed, it is diluted so as to have a concentration for easy use. If desired, other water-soluble resins may be incorporated into the water-soluble composition of the present invention depending upon the end use, e.g., urea, water-soluble condensates between melamine or phenols with aldehydes or the esterified products thereof, water-soluble compounds, for example, water-soluble titanium compounds, e.g., dihydroxy bis(hydrogen lactato)titanium and the ammonium salts thereof, and water-soluble zirconium compounds and the like. These optional resins can be used in an amount less than about 10, usually about 0.1 to 5% by weight based on the weight of resin content of the composition.

In addition, organic metal salts such as tin, zinc, manganese, iron, cobalt, lead or a like salt of octenoic acid or naphthenic acid which are not water-soluble in nature but are useful as a polymerization accelerator can also be incorporated as long as the amount used is as low as about 0.01 to 0.1% by weight.

The present invention is illustrated in greater detail by reference to the following examples. Unless otherwise indicated herein, all parts, percents, ratios and the like are by weight.

EXAMPLE 1

117.0 g (0.5 moles) of 1,2,3,4-butane tetracarboxylic acid, 99.0 g (0.5 moles) of 4,4'-diaminodiphenylmethane and 70.0 g of triethylene glycol were put into a 500 ml three necked flask equipped with a thermometer, a trap condenser and a stirrer, and the mixture was heated with stirring. When the temperature was near 100°C, water started to distill off and the reaction system gradually became homogeneous and dark brown. By continuing the heating, the temperature of the reaction system gradually increased and the viscosity thereof increased. After about 1 hour from the time the water started to distill off, the temperature of the reaction system reached 130°C. At this time, the amount of distilled water was 14 ml and the acid value of the reaction product was 1.54 mg equivalent per gram (residual acid value ratio: 22.0%). Then the reaction was stopped and an aqueous ammonia solution was added at 80° to 100°C to form an ammonium salt of the polyimide precursor. The aqueous ammonia solution used was prepared by diluting a 28% aqueous ammonia solution with 1.5 times by volume of pure water. The excess ammonia volatilized from the system after formation of the salt. Thus, the resulting water-soluble composition hardly had any smell of ammonia.

The resulting water-soluble composition was diluted with pure water to prepare a wire enamel having a viscosity of 9.4 poises (at 30°C) and a solid content 45.4% (after being dried at 200°C for 2 hours). This wire enamel was applied 6 times to a copper wire having a diameter of 1.0 mm at 5.0 m/min using a vertical furnace having a height of 3.0 m at 420°C. The properties of the baked wire were as follows.

| | |
|---|---|
| Thickness of the Coated Film | 0.041 mm |
| Windability | |
|   Self Diameter Winding | Good |
|   " (after 5% stretching) | " |
|   " (after 10% stretching) | " |
|   " (after 15% stretching) | " |
| Heat Softening Temperature (2 kg load) | 415°C |
| Reciprocating Abrasion Resistance (600 g load) | 72 |
| Peeling Test (20 cm span) | 82 |
| Heat Shock Resistance | |
|   250°C × 2 hours | Good at self diameter |
|   300°C × 2 hours | " |
| Breakdown Voltage (normal state) | 11.3 KV |
| Heat Deterioration Windability | |
|   220°C × 24 hours | Good at self diameter winding |
| Burn Out Property | |
|   42A, 20 seconds ON; 10 seconds OFF (120 V) | 83 cycles |

COMPARISON 1

1,2,3,4-Butane tetracarboxylic acid, 4,4'-diaminodiphenyl-methane and triethylene glycol were mixed with heating in the same manner as in Example 1. The reaction was carried out in the same manner as in Example 1. The reaction was stopped when the temperature reached 120°C. At this time, 13 ml of water had distilled and the reaction product had an acid value of 2.39 mg (residual acid value ratio: 34.2%). An aqueous ammonia solution was added dropwise thereto at 80° to 100°C to form an ammonium salt of the polyimide precursor. The resulting water-soluble composition hardly had any bad ammonia odor. The resulting water-soluble composition was diluted with water to produce a wire enamel having a viscosity of 4.3 poises (30°C) and a solid content 45.2% (after being dried at 200°C for 2 hours). When this wire enamel was applied to a wire of 1.0 mmφ and baked under the same conditions as in Example 1, foaming was observed on the coated wire. The properties of the wire were as follows, which are inferior to those in Example 1.

| | |
|---|---|
| Thickness of the Coated Film | 0.041 mm |
| Windability | |
|   Self Diameter Winding | Good |
|   " (after 5% stretching) | " |
|   " (after 10% stretching) | Bad |
|   " (after 15% stretching) | " |
| Heat Softening Temperature (2Kg load) | 409°C |
| Reciprocating Abrasion Resistance (600 g load) | 53 |
| Peeling Test (20 cm span) | 70 |
| Heat Shock Resistance | |
|   250°C × 2 hours | Good at 3 times diameter |
|   300°C × 2 hours | Good at 5 times diameter |
| Breakdown Voltage (normal state) | 8.7 KV |
| Heat Deterioration Windability | |
|   220°C × 24 hours | Good at 4 times diameter winding |
| Burn-Out Property | |
|   42A, 20 seconds ON, 10 seconds OFF (120 V) | 45 cycles. |

COMPARISON 2

117.0 g (0.5 moles) of 1,2,3,4-butane tetracarboxylic acid and 99.0 g (0.5 moles) of 4,4'-diaminodiphenylmethane were added to 144.0 g of N-methyl-2-pyrrolidone in the same type of flask as in Example 1 and the mixture was heated with stirring to increase the temperature. During the temperature increase, about 28 g of water distilled off. When the reaction temperature reached 150°C, N-methyl-2-pyrrolidone was added thereto in the same amount as the water removed. After heating at 150°C for 6 hours with stirring, 72.5 g of N-methyl-2-pyrrolidone was added thereto. To 240 g of the resulting polyimide solution, 38.6 g of diethanolamine and 202 g of water were added with stirring at room temperature to produce a homogeneous solution.

The resulting polyimide water solubilized composition was applied to a wire and baked under the same conditions as in Example 1. The appearance of the coated wire was inferior to that of Example 1. The properties of this wire were as follows.

| | |
|---|---|
| Thickness of the Coated Wire | 0.040 mm |
| Windability | |
| Self Diameter Winding | Good |
| " (after 5% stretching) | " |
| " (after 10% stretching | Bad |
| " (after 15% stretching) | " |
| Heat Softening Temperature (2Kg load) | 403°C |
| Reciprocating Abrasion Resistance (600 g load) | 45 |
| Peeling Test (20 cm span) | 71 |
| Heat Shock Resistance | |
| 250°C × 2 hours | Good at 3 times diameter |
| 300°C × 2 hours | Good at 4 times diameter |
| Breakdown Voltage (normal state) | 8.5 KV |
| Heat Deterioration Windability | |
| 220°C × 24 hours | Good at 3 times diameter winding |
| Burn-Out Property | |
| 42A, 20 seconds ON, 10 seconds OFF (120 V) | 42 cycles |

EXAMPLE 2

117.0 g (0.5 moles) of 1,2,3,4-butane tetracarboxylic acid, 35.0 g of triethylene glycol and 100 g of distilled water were put into the same type of flask as in Example 1. When the mixture was heated with stirring, it immediately became homogeneous and clear. 99.0 g (0.5 moles) of 4,4'-diaminodiphenylmethane was added at about 80°C and the mixture was stirred, by which water started to distill at about 100°C. After 2 hours, water initially present and water formed in the reaction were removed by distillation and the temperature of the mixture reached 130°C. At this time, the amount of distillate was 113 g. Thus a polyimide precursor having an acid value of 1.82 mg equivalent per gram (residual acid value ratio: 22.8%) was produced. Then, it was treated with an aqueous ammonia solution to form an ammonium salt. The resulting water-soluble composition was diluted with pure water to produce a wire enamel. The properties of the coated wire which was obtained by baking were substantially the same as those of Example 1.

EXAMPLE 3

117.0 g (0.5 moles) of 1,2,3,4-butane tetracarboxylic acid, 99.0 g (0.5 moles) of 4,4'-diaminodiphenylmethane and 70.0 g of ethylene glycol were put into the same type of flask as in Example 1 and the mixture was heated with stirring. The reaction was carried out in the same manner as in Example 1 to produce a polyimide precursor having an acid value of 1.51 mg equivalent per gram (residual acid value ratio: 21.6%). The precursor was then treated with an aqueous ammonia solution to form an ammonium salt. The resulting water-soluble composition was diluted with pure water to produce a wire enamel. The properties of the coated wire which was obtained by baking were subtantially the same as those of Example 1.

EXAMPLE 4

117.0 g (0.5 moles) of 1,2,3,4-butane tetracarboxylic acid, 100.0 (0.5 moles) of 4,4'-diaminodiphenyl ether and 100.0 g of glycerine were put into the same type of flask as in Example 1 and the mixture was heated with stirring. The reaction was carried out in the same manner as in Example 1 and the heating was continued at 130°C for about 1 hour to produce a polyimide precursor having an acid value of 0.69 mg equivalent per gram (residual acid value ratio: 10.9%). The precursor was then treated with an aqueous ammonia solution to form an ammonium salt. The resulting water-soluble composition was diluted with pure water to produce a wire enamel having a viscosity of 550 poises (30°C) and a solid content of 50.8% (after being dried at 200°C for 2 hours). After this composition was applied to a heat resisting glass plate using a knife coater, it was dried at 80°C for 2 hours, 120°C for 1 hour and 250°C for 1 hour to form a film. The properties of the resulting film were as follows.

| | |
|---|---|
| Thickness of the Film | 50 μ |
| Tensile Strength (ASTM D 882-61T) | 13.0 Kg/cm$^2$ |
| Elongation ( " ) | 25% |
| Dielectric Constant (1 KHz, 20°C) | 4.0 |
| Dielectric Loss Tangent ( " ) | 0.003 |

EXAMPLE 5

117.0 g (0.5 moles) of 1,2,3,4-butane tetracarboxylic acid, 58.0 g (0.5 moles) of hexamethylenediamine and 35.0 g of ethylene glycol monoethyl ether were put into the same type of flask as in Example 1 and the mixture was heated with stirring. The reaction was carried out in the same manner as in Example 1 to produce a polyimide precursor having an acid value of 2.23 mg equivalent per gram (residual acid value ratio: 23.4%). The precursor was then treated with an aqueous ammonia solution to form an ammonium salt. The resulting water-soluble composition was diluted with pure water.

After this composition was applied to a heat resisting glass plate using a knife coater, it was dried at 80°C for 2 hours, 120°C for 1 hour and 250°C for another 1 hour to obtain a flexible and tough film.

As is illustrated above, the present invention not only contributes to prevention of problems such as pollution of the environment, but the resulting objects produced from the water-soluble compositions have good properties such as good heat resistance and good electrically insulating properties, etc. Accordingly, they are industrially useful as electrically insulating coatings, films, adhesives, laminating materials, impregnating materials for glass fibers or coating materials for metal foils, etc.

While the invention has been described in detail and with reference to specific embodiments thereof, it will be apparent to one skilled in the art that various changes and modifications can be made therein without departing from the spirit and scope thereof.

What is claimed is:

1. A water-soluble composition comprising an ammonium salt of a polyimide precursor having a residual acid value ratio of about 3 to 30%, said ammonium salt of said polyimide precursor being obtained by the reaction steps of:

a. reacting 1,2,3,4-butane tetracarbocylic acid and a diamine in about equimolar amounts in a water soluble solvent and, optionally, water at a temperature of from about 60°C to a boiling point of the reaction system to obtain a polyimide precursor and b. treating said polyamide precursor with ammonia or an aqueous solution of ammonia in an amount at least equimolar to the acid value of the formed polyimide precursor at a temperature of from about 0° to 200°C.

2. The composition according to claim 1, wherein said diamine is represented by the formula $$H_2N - R' - NH_2$$

wherein R' represents an aliphatic, alicyclic or aromatic divalent group.

3. The composition according to claim 2, wherein said diamine is selected from the group consisting of m-phenylenediamine, p-phenylenediamine, 4,4'-diaminodiphenylmethane, 4,4'-diaminodiphenylethane, 4,4'-diaminodiphenylpropane, 4,4'-diaminodiphenyl ether, 3,4'-diaminodiphenyl ether, benzidine, 3,3'-dimethoxybenzidine, 4,4'-diaminophenyl sulfide, 4,4'-diaminodiphenyl sulfone, 3,3'-diaminodiphenyl sulfone, p-bis(4-amino-phenoxy)-benzene, m-bis(4-aminophenoxy)-benzene, 4,4'-diamino-biphenyl, m-xylylenediamine, p-xylylenediamine, di-(p-amino-cyclohexyl)-methane, hexamethylenediamine, heptamethylenediamine, octamethylenediamine, nonamethylenediamine, 4,4-dimethylheptamethylenediamine, 3-methoxyheptamethylenediamine, 2,11-diamino-dodecane, 1,4-diaminocyclohexane, 2,2'-diaminodiethyl ether, 2,2'-diaminodiethyl thioether, 3,3'-diaminodipropoxyethane, 2,6-diaminopyridine, guanamine, 2,5-diamino-1,3,4-oxadiazole, 2-(3'-aminophenyl)-5-aminobenzoxazole, bis(4-aminophenyl)-phosphine oxide and bis(4-aminophenyl)-diethyl silane, and a mixture thereof.

4. The composition of claim 1, wherein said water-soluble solvent has the general formula (a)

$$R - OH \quad (a)$$

wherein R represents a monovalent organic group of an aliphatic or alicyclic compound having 3 to 8 carbon atoms; the general formula (b)

$$HO - R_1 - OH \quad (b)$$

wherein $R_1$ represents (1) a divalent organic group of an aliphatic or alicyclic compound having 3 to 8 carbon atoms, or (2) a divalent group having the formula $$-(\overset{R_2}{C}HCH_2O)_n-\overset{R_2}{C}HCH_2-$$

wherein $n$ represents 0 to 5 and $R_2$ represents a hydrogen atom or a methyl group; the general formula (C)

$$R_3 O - (CH_2CH_2O)_m - R_4 \quad (c)$$

wherein $m$ represents 1 to 3, $R_3$ represents a lower alkyl group having 1 to 4 carbon atoms, and $R_4$ represents a hydrogen atom or a —OOCCH group, or $R_3$ and $R_4$ are both methyl groups; the general formula (d)

wherein $R_5$ represents a residual group of glycerine or trimethylolpropane; or a basic organic solvent selected from the group consisting of N-methyl2-pyrrolidone, N,N-dimethylacetamide and N,N-dimethylformamide.

5. The composition of claim 4, wherein said water-soluble solvent having the general formula (a) is isopropyl alcohol, n-butyl alcohol, t-butyl alcohol, hexyl alcohol or cyclohexanol.

6. The composition of claim 4, wherein said water-soluble solvent having the general formula (b) is ethylene glycol, diethylene glycol, triethylene glycol, tetraethylene glycol, low molecular weight polyethylene glycol, propylene glycol, dipropylene glycol, 1,4-butanediol, 1,6-hexanediol, or 1,4-cyclohexanediol.

7. The composition of claim 4, wherein said water-soluble solvent having the general formula (c) is ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monoisopropyl ether, diethylene glycol monobutyl ether, triethylene glycol monomethyl ether, ethylene glycol dimethyl ether, diethylene glycol dimethyl ether, ethylene glycol monoethyl ether acetate, or diethylene glycol monoethyl ether acetate.

8. The composition of claim 4, wherein said water-soluble solvent having the general formula (d) is glycerine or trimethylolpropane.

* * * * *

UNITED STATES PATENT AND TRADEMARK OFFICE
CERTIFICATE OF CORRECTION

PATENT NO. : 3,925,313
DATED : December 9, 1975
INVENTOR(S) : Makoto Kojima et al It is certified that error appears in the above–identified patent and that said Letters Patent are hereby corrected as shown below:

IN THE CLAIMS:

Column 9, line 4, delete "polyamide" and insert therefor

-- polyimide --.

Signed and Sealed this fourth Day of May 1976

[SEAL]

Attest:

RUTH C. MASON
*Attesting Officer*

C. MARSHALL DANN
*Commissioner of Patents and Trademarks*